United States Patent
Arndt et al.

(10) Patent No.: US 7,207,180 B2
(45) Date of Patent: Apr. 24, 2007

(54) AIR CONDITIONER, IN PARTICULAR FOR USE IN MOTOR VEHICLES, AND A METHOD FOR ITS OPERATION

(75) Inventors: Michael Arndt, Reutlingen (DE); Gerd Lorenz, Reutlingen (DE); Thomas Sperlich, Reutlingen (DE)

(73) Assignee: Robert Bosch GmbH (DE)

( * ) Notice: Subject to any disclaimer, the term of this patent is extended or adjusted under 35 U.S.C. 154(b) by 215 days.

(21) Appl. No.: 10/896,563

(22) Filed: Jul. 21, 2004

(65) Prior Publication Data

US 2005/0039468 A1 Feb. 24, 2005

(30) Foreign Application Priority Data

Aug. 8, 2003 (DE) ............... 103 37 753

(51) Int. Cl.
*F25B 49/00* (2006.01)
*B60H 1/00* (2006.01)

(52) U.S. Cl. ............... 62/126; 62/127; 62/129; 454/75

(58) Field of Classification Search ............... 62/126, 62/127, 129, 244; 236/49.3; 454/75
See application file for complete search history.

(56) References Cited

U.S. PATENT DOCUMENTS

| | | | |
|---|---|---|---|
| 4,638,525 A | | 1/1987 | Sugita et al. |
| 5,918,475 A | * | 7/1999 | Sakakibara et al. ........... 62/186 |
| 6,004,496 A | | 12/1999 | Reo |
| 6,254,167 B1 | | 7/2001 | Goto et al. |
| 6,317,918 B1 | | 11/2001 | Kagawa et al. |
| 6,758,739 B1 | * | 7/2004 | Sangwan et al. ............. 454/75 |

FOREIGN PATENT DOCUMENTS

| | | |
|---|---|---|
| DE | 19612231 | 10/1997 |
| DE | 19741225 | 3/1998 |
| DE | 19833488 | 1/1999 |
| DE | 19737070 | 3/1999 |
| DE | 19814804 | 10/1999 |
| DE | 19833158 | 1/2000 |
| DE | 19850914 | 5/2000 |
| DE | 19944274 | 3/2001 |
| DE | 10116929 | 11/2002 |
| EP | 0863057 | 9/1998 |
| EP | 0916559 | 5/1999 |
| EP | 1040972 | 10/2000 |
| GB | 2347340 | 9/2000 |
| JP | 57030646 | 2/1982 |
| JP | 61105257 | 5/1986 |
| JP | 4309534 | 11/1992 |

\* cited by examiner

*Primary Examiner*—Marc Norman
(74) *Attorney, Agent, or Firm*—Michael Best & Friedrich LLP

(57) ABSTRACT

The invention relates to an air conditioner, in particular for use in motor vehicles, with a cooling circuit and a ventilation system, wherein the cooling circuit features an evaporator/heat exchanger (12) that is arranged in the ventilation system, and wherein a gas sensor (30) is provided in the ventilation system downstream from the evaporator/heat exchanger (12) to detect the rates of a refrigerant of the evaporator/heat exchanger (12) of the air conditioner in the conveyed air-conditioned air. It is provided that the gas sensor (30) is arranged at a narrow point (32) and/or in an area of turbulent flow of an air guidance channel (10) of the ventilation system. The invention also relates to a method to operate such an air conditioner.

24 Claims, 4 Drawing Sheets

Figure 1:
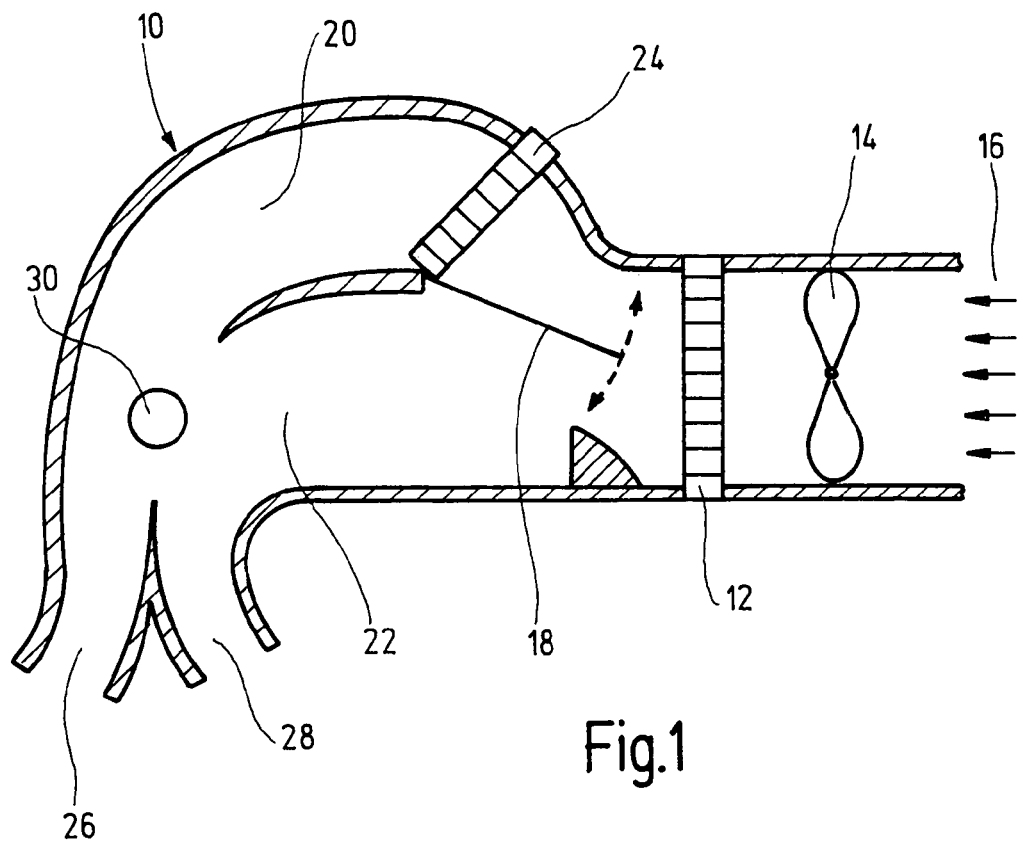

AIR CONDITIONER, IN PARTICULAR FOR USE IN MOTOR VEHICLES, AND A METHOD FOR ITS OPERATION

The invention relates to an air conditioner, in particular for use in motor vehicles.

STATE OF THE ART

In the case of known air conditioners for use in motor vehicles, so-called fluorohydrocarbon R134a is oftentimes used. Due to the increasing strain on the earth's atmosphere from fluorohydrocarbons acting as greenhouse gases, in the future, air conditioners in motor vehicles must be operated with alternative refrigerants. Carbon dioxide (R744) in particular is suitable as an alternative refrigerant. However, due to leaks in the evaporator of these types of air conditioners, under some circumstances larger amounts of carbon dioxide can make their way into the passenger compartment of a motor vehicle. Since greater concentrations of carbon dioxide are injurious to the health, the inadvertent exit of the refrigerant must be prevented or at least detected. As a result, it can be necessary to use a carbon dioxide sensor to monitor the air flowing through the evaporator. The position of this sensor can be located both within the air conditioner as well as within the passenger compartment of the vehicle.

Critical leaks in the air conditioner evaporator can occur in principle at all locations of the evaporator—for example, at the connectors and at any location on the surface of the heat exchanger. Depending upon the size of these types of leaky locations, it can occur in this case that, with a small leak in a location that is unfavorably situated in terms of detection, a so-called streaking formation of the exiting refrigerant in the air-conditioned air occurs when the gaseous refrigerant is exiting. As a result, the exiting refrigerant is not distributed uniformly in the conveyed air; rather, it forms a spatially restricted refrigerant streak in the downstream air flow. The installation location of a gas sensor in the air guidance behind the evaporator influences the sensitivity of the gas sensor to the rates of the refrigerant in the air flow.

An air conditioner with a cooling circuit and a ventilation system in which carbon dioxide is used as the refrigerant is known from DE 198 50 14 A1. A carbon dioxide sensor is arranged in this case in the ventilation system in the flow direction behind the heat exchanger. The sensor's signal triggers a valve, which is arranged in the ventilation system in the flow direction behind the heat exchanger and which can interrupt the air supply from the ventilation system into the passenger compartment of the motor vehicle.

ADVANTAGES OF THE INVENTION

An air conditioner in accordance with the invention provides for a gas sensor arranged within an air guidance channel that can detect an exit of refrigerant from an evaporator/heat exchanger unit. By arranging a gas sensor within a narrow point of the air guidance channel, preferably directly downstream from an evaporator/heat exchanger of the air conditioner, it is possible to reliably detect even small rates of refrigerant in the conveyed air-conditioned air, and even refrigerant streaks within the air flow can be detected reliably. Alternatively or in addition, the air flow can also be set into turbulence, wherein the gas sensor is arranged in an area of turbulent flow. Even in this case, high rates of refrigerant concentrations passing by the gas sensor undetected can also be prevented.

Arranging the gas sensor in the passenger compartment air guidance behind the air conditioner's evaporator or the heat exchanger can guarantee that, independent of the location of the leak of the heat exchanger, exiting refrigerant can be detected immediately and safety measures to protect the vehicle's passengers can be initiated without appreciable delay.

In accordance with the invention, the installation of the gas sensor to detect losses of refrigerant in the air being conveyed for ventilating or air conditioning the vehicle's passenger compartment takes place after the flow-through of the evaporators at a location at which the entire volume of air must pass before it is distributed to the individual additional air inlet locations of the passenger compartment of the vehicle and whose size is dimensioned in such a way that the entire air quantity flowing through can be detected with one sensor. This is the case with the downstream side of the evaporator at a first narrowing of the air guidance channel. In this connection, the design of this narrow point is preferably accomplished in such a way that the narrowing of the channel cross-section of the air guidance follows from the minimum cross-section that is still tolerable in terms of noise with maximum air quantity. Depending upon the formation of the cross-section narrowing, flow rates of 12 to 15 meters per second are tolerable in this case without additional noise muffling measures. On the other hand, flow rates of only 3 to 5 meters per second are possible in the heat exchanger for adequate heat transmission. A narrowing of the cross-section to approx. 20% of the cross-section of the evaporator is therefore possible at the installation location of the gas sensor.

If an optical absorption sensor is selected as the gas sensor, a favorable structure with a rectangular cross-section with the highest possible ratio of length to its width is yielded to increase the sensitivity of the absorption section of the sensor, whereby the absorption section lies in the direction of the length of the channel cross-section.

In another embodiment of the invention, the installation location of the gas sensor to detect refrigerant losses in the air destined for ventilating the passenger compartment is selected in such a way that, due to the different specific densities of air and exited refrigerant, the medium with the greater density preferentially reaches the installation location of the gas sensor. The standard density of air is 1.293 kg/m$^3$ and is therefore clearly lower than the standard density of refrigerants that are typically used or are common in vehicle air conditioning systems such as carbon dioxide (R744), for example, which has a standard density of 1.98 kg/m$^3$. Even other refrigerants like difluoroethane (R152a) with a density of approx. 4.6 kg/m$^3$ and tetrafluoroethane (R134a) with a density of approx. 7.2 kg/m$^3$ have a clearly greater density than air.

Added to this is that during the operation of the air conditioner, the refrigerant exiting through a leak in the evaporator has a clearly lower temperature and thus a yet again higher density than the surrounding air. If air destined for ventilating the passenger compartment of the vehicle is now deviated once or twice immediately after passing through the evaporator, then the concentration of the denser gas, i.e., the exiting refrigerant, always increases on the outer edge of the air channel arc section. This effect is all the greater, the greater the angle of the deviation in the air guidance is.

The deviations should be accomplished in an expedient manner downward, i.e., in the direction of gravity so that even in the case of slower air flow in which a lower effect occurs through the deviation of the additional air, the denser refrigerant collects at the same location and is detected there by the gas sensor. This type of arrangement of the gas sensor at a low location of a deviated air guidance channel also offers the advantage that when refrigerant is exiting while the air conditioner is turned off, it also collects at the installation location of the gas sensor because of its higher density.

The above-mentioned reductions in the cross-section and the cited deviation of the air can also be made possible by built-ins in an air channel that is otherwise unchanged with respect to its cross-section and its directional course. A combination of the cited measures is also possible in a different form. If the heat exchanger in an air conditioner with heat pump functionality is also used to heat air destined for the passenger compartment, the described principles can also be applied in the same manner.

Additional advantageous embodiments of the invention are yielded from the features cited in the dependent claims.

DRAWINGS

The invention is described in greater detail in the following in preferred exemplary embodiments on the basis of the associated drawings. The drawings show:

FIG. 1 A schematic longitudinal section of a portion of a vehicle air conditioner.

Figure 2:
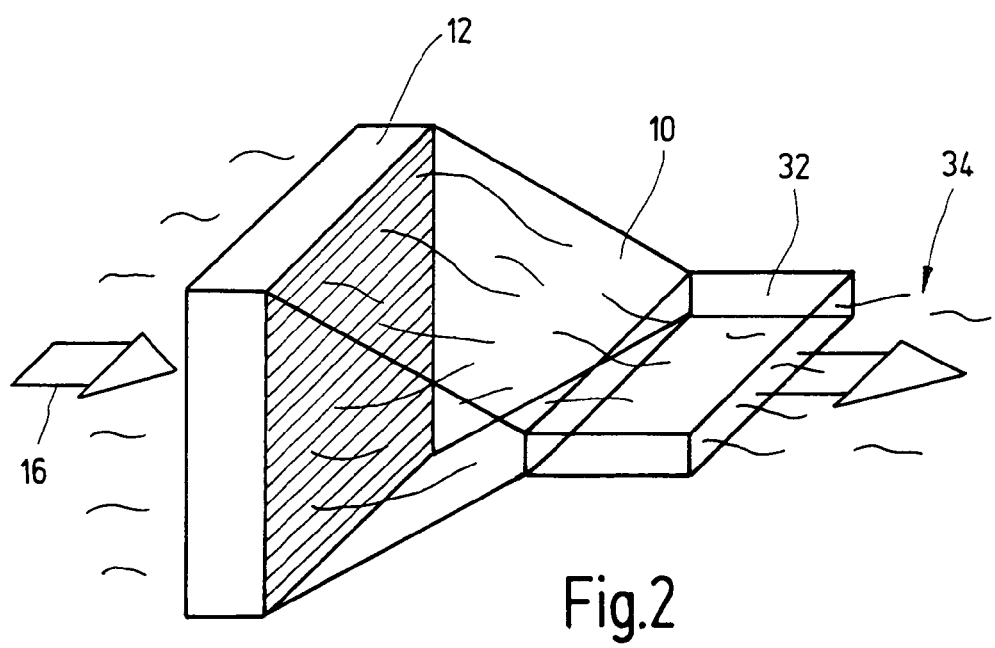

FIG. 2 A schematic perspective representation of an air guidance channel arranged downstream from an evaporator/heat exchanger of the air conditioner.

Figure 3:
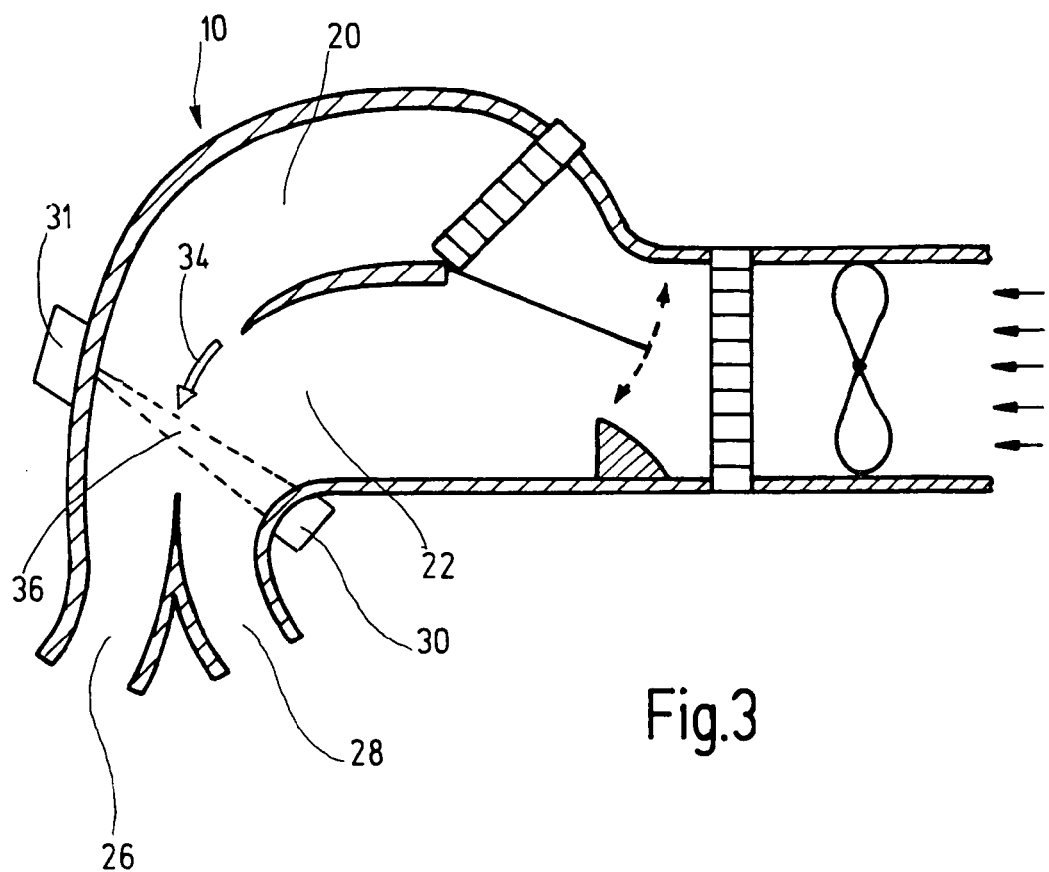

FIG. 3 Another schematic longitudinal section of a portion of the vehicle air conditioner with a gas sensor arranged in the air guidance channel.

Figure 4:
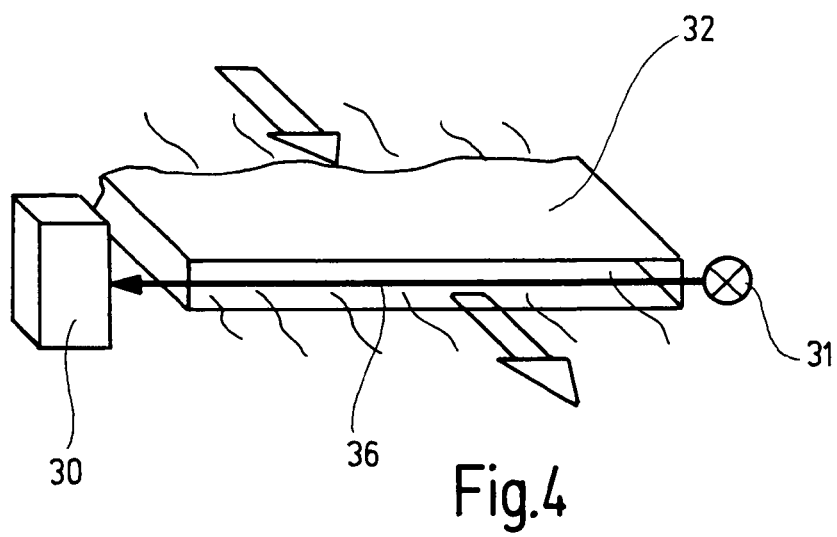

FIG. 4 A depiction of the principle of an arrangement of an optical measured section of the gas sensor.

Figure 5:
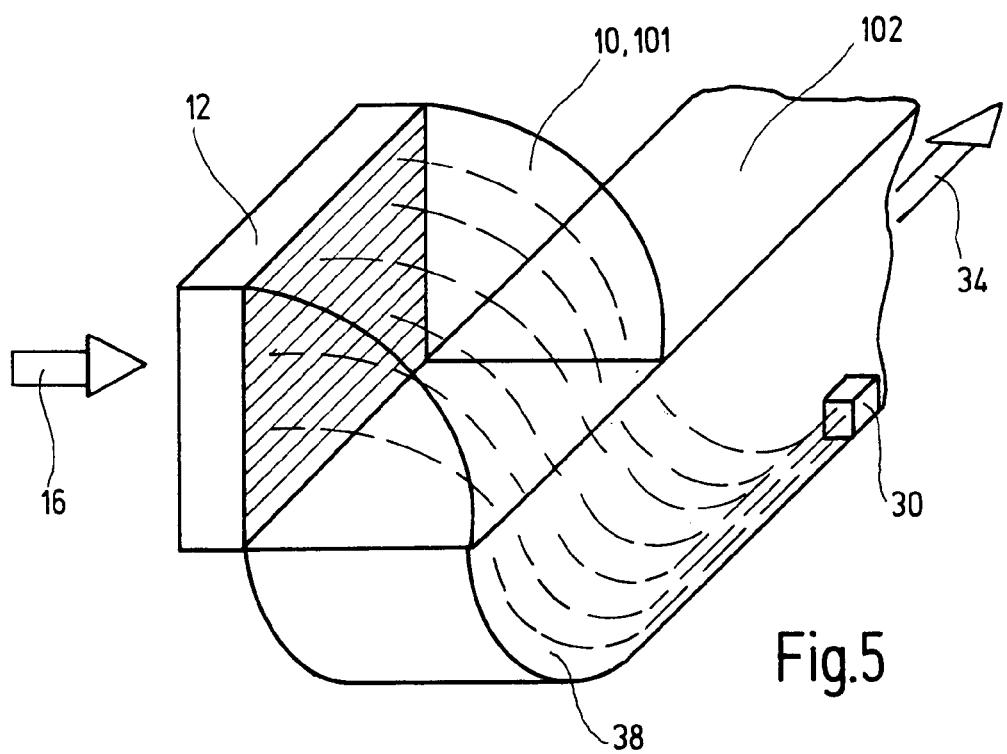

FIG. 5 An alternative design of the air guidance channel with a simple deviation of the air being guided therein.

Figure 6:
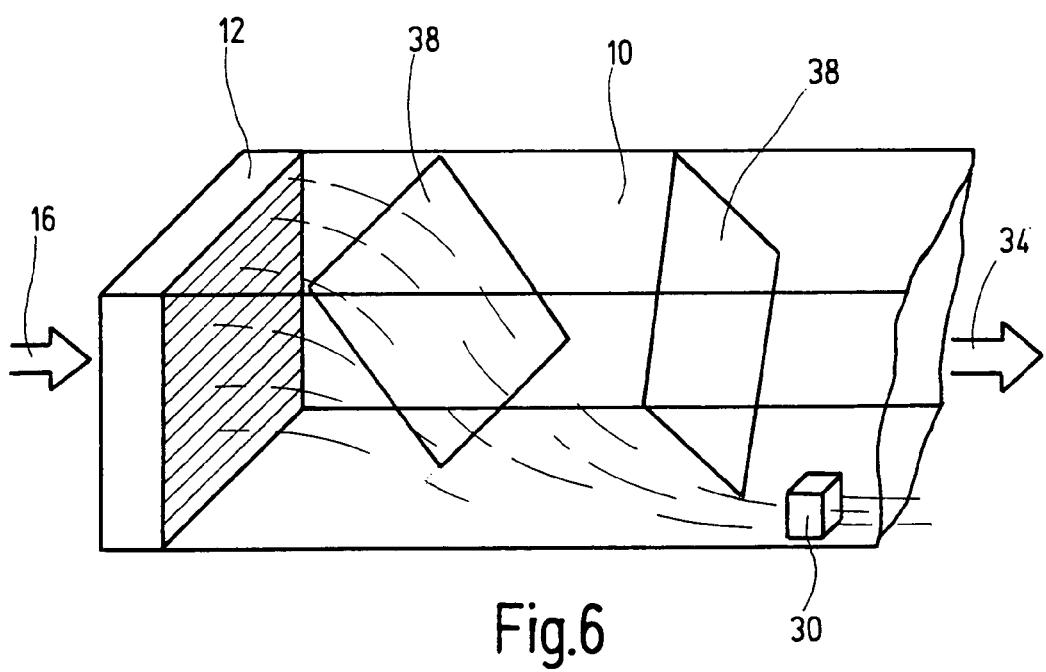

FIG. 6 Another alternative design of the air guidance channel with a multiple deviation of the air-conditioned air.

Figure 7:
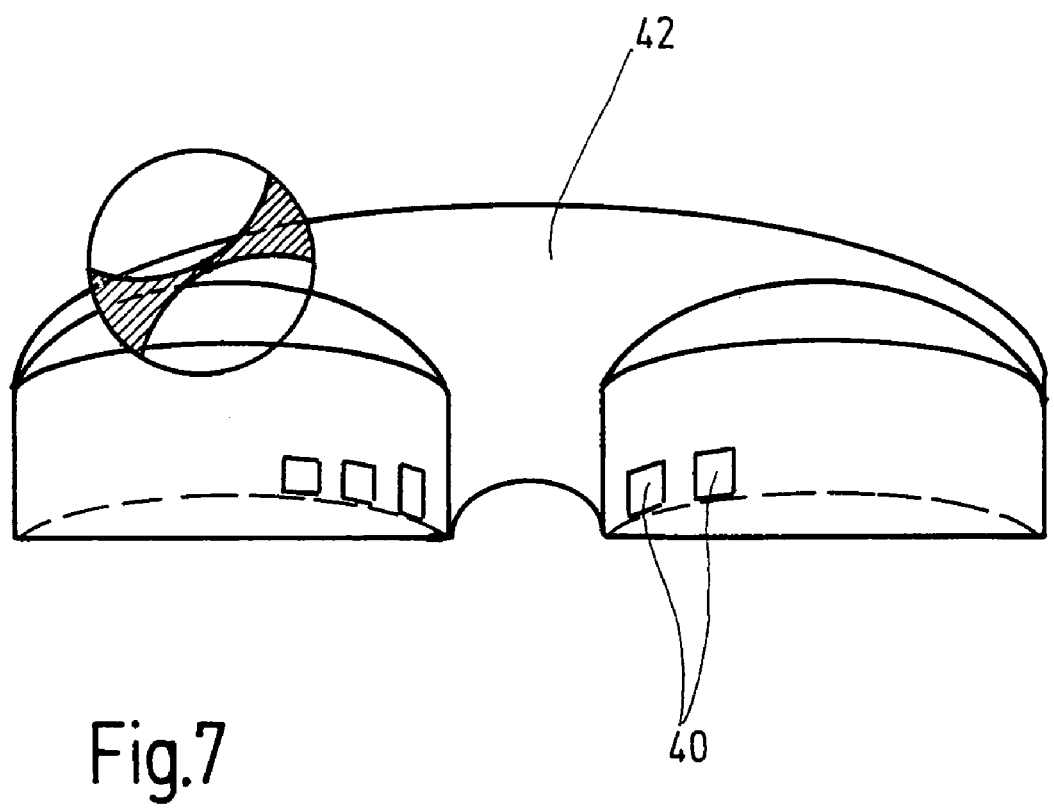

FIG. 7 An exemplary arrangement of exit locations for air-conditioned air in the passenger compartment of a vehicle.

DESCRIPTION OF THE EXEMPLARY EMBODIMENTS

FIG. 1 shows a schematic sectional representation of an air guidance channel 10, which is part of an air conditioner, which can be a motor vehicle air conditioner in particular. A fan 14 is arranged in front of an evaporator or heat exchanger 12, and the fan inducts the to-be-air-conditioned air 16 and conveys it through the evaporator/heat exchanger 12. A branch-off location is provided in the air guidance channel 10 downstream from the evaporator/heat exchanger 12, and this branch-off location is where the air-conditioned air is divided by means of a movable valve 18 between an upper channel 20 and a lower channel 22 or each of these channels 20, 22 can be closed completely or partially. An optional heating device 24 is arranged within the upper channel 20 and it can be used to bring the air-conditioned air to a desired temperature in the passenger compartment.

In the downstream lower area of the air guidance channel 10, the channel branches off into different flow channels 26 and 28, each of which leads to different discharge openings in the passenger compartment of the vehicle. At least one gas sensor 30 is arranged downstream from the evaporator/heat exchanger 12 and it is used to detect impermissible rates of refrigerant from the evaporator/heat exchanger 12 in the air-conditioned air. If the evaporator/heat exchanger 12 has a leak, refrigerant can escape, which for example can be carbon dioxide, which is injurious to the health in too high a concentration.

In order to detect this type of refrigerant leak in a timely manner without the vehicle's passengers being impaired, the gas sensor 30 in the depicted embodiment is arranged in an area of the air guidance channel 10 in which the air-conditioned air is located in a turbulent flow. The turbulences of the flow are generated by the arrangement of the branch-off within a curved section of the channel. In this way, it is possible to reliably prevent the gas sensor 30 from not detecting flow threads with higher concentrations of refrigerant since these do not flow through within an optical measured section, for example.

In a schematic perspective representation, FIG. 2 illustrates an alternative design of the air guidance channel 10, which has a narrow point 32 in the area downstream from the evaporator/heat exchanger 12. All of the to-be-air-conditioned air 16 passes through the evaporator/heat exchanger 12 at a relatively low flow rate of approx. 3 to 5 meters per second, for example. With this low flow rate, the air can be adequately air conditioned in a relatively short time. Because of the narrowing of the air guidance channel 10 to up to 20% of its original cross-section, an increase in the flow rate to approx. 12 to 15 meters per second and, if necessary, simultaneous swirling of the air-conditioned air 34 can be achieved so that no unnoticed refrigerant threads of any sort whatsoever can remain undetected by the gas sensor 30 in the flow from the evaporator/heat exchanger 12.

The narrow point 32 can be designed in the manner shown by the air guidance channel 10, which has a largely rectangular cross-section, running in a funnel-shaped manner. The desired increase in the flow rate can be defined by the cross-section of the narrow point 32. The gas sensor 30 is preferably arranged in the narrow point 32 of the air guidance channel 10 in such a way that all the air-conditioned air 34 must pass by the gas sensor 30 to a large extent. An exemplary arrangement of the gas sensor 30 within the narrow point 32 of the air guidance channel 10 is shown in FIG. 4.

If necessary, in accordance with the exemplary embodiment shown in FIG. 1, additional devices can be provided between the evaporator/heat exchanger 12 and the gas sensor 30 in order to set the air-conditioned air into turbulence so that refrigerant threads cannot pass through the gas sensor 30 undetected.

FIG. 3 shows a possible arrangement of the gas sensor 30 in which a channel-like optical measured section 36 runs transverse to the flow direction of the air-conditioned air 34. The gas sensor 30 can be an optical sensor in particular, such as an infrared sensor, which detects the rates of the refrigerant like carbon dioxide or Frigene within the air-conditioned air 34 by means of an absorption measurement.

The optical measured section 36 in this case is formed between an infrared light source 31 and a sensor 30 that is sensitive to infrared light. The overall structure of the sensor is typically comprised of a so-called infrared photometer with an infrared radiator as a light source 31, the measured section 36 and the radiation detector, which is designated as a gas sensor 30 in the case at hand. The optical measured section 36 that runs between the light source 31 and the gas sensor 30 runs transverse through the narrow point 32 of the air guidance channel 10 as illustrated in FIG. 4.

The signal of the gas sensor 30 can be used, for example, to turn off the air conditioner, to trigger a valve, which with the air guidance channel 10 is preferably completely or partially closed, and/or to trigger a signal transmitter that warns the vehicle's passengers about too high a concentration of carbon dioxide.

FIG. 5 illustrates another alternative embodiment of the invention in which the gas sensor 30 is arranged in a lower area 38 of the deviated air guidance channel 10. The air guidance channel 10 in this case runs first in a section 101 that is curved downward, which discharges into an upper side of a box-shaped transverse channel 102. Since the refrigerant that is typically used is without exception heavier than air, the gas sensor 30 in the depicted arrangement is located in an area of very high refrigerant concentration, in case the refrigerant exits from a leak in the evaporator/heat exchanger 12.

The standard density of air is 1.293 kg/m$^3$ and is therefore substantially lower than the density of common refrigerants like, for example, carbon dioxide (R744) with a standard density of 1.98 kg/m$^3$, propane (R290) with a standard density of 2.00 kg/m$^3$, or Frigene (R12) with a standard density of 5.51 kg m$^3$. This effect is intensified by the temperature of the exiting refrigerant that is distinctly lower when the air conditioner is in operation, so that it has a yet again higher density as compared to air. Even other refrigerants like difluoroethane (R152a) with a density of approx. 4.6 kg/m$^3$ and tetrafluoroethane (R134a) with a density of approx. 7.2 kg/m$^3$ have a distinctly higher density than air.

FIG. 6 illustrates an alternative embodiment of the air guidance channel 10 in which the air guidance of the air-conditioned air 34 occurs in a downward manner and its narrowing and therefore the increase in the flow rate occurs by means of air deflectors 38 arranged in an offset manner in the air guidance channel 10. The air deflectors 38 make a deviation of the air-conditioned air 34 downward possible as well as an artificial narrowing of the air guidance channel 10 to a desired cross-section so that the flow rate of the conveyed air-conditioned air 34 can be increased to a desired value.

If the air destined for ventilating the passenger compartment of the vehicle is deviated once or twice immediately after passing through the evaporator/heat exchanger 12, the concentration of the denser refrigerant gas always increases on the outer edge of the curved locations. This effect is more pronounced with narrower radii of curvature and with larger angles of deviation. The curvatures are preferably downward in the direction of gravity, as shown in FIGS. 5 and 6, so that even in the case of slower air flow in which a lower effect occurs through the deviation of the air, the denser refrigerant collects at the lower locations of the air guidance channel 10 and can be detected there by the gas sensor 30.

The schematic representation in FIG. 7 illustrates a preferred arrangement possibility of the gas sensor within a lower flow channel or an exit location 40 for air-conditioned air that is arranged low in the passenger compartment of the vehicle. These locations are typically located in the footwell of the vehicle. Reliable detection of refrigerant leaks is made possible in this way because of the substantially higher density of the refrigerant that is typically used, since the concentration of the refrigerant at the low exit location 40 is normally substantially greater than at exit locations that are arranged higher, for example those that are situated in the upper area of the instrument panel 42 in the passenger compartment of the vehicle.

The invention claimed is:

1. Air conditioner, in particular for use in motor vehicles, with a cooling circuit and a ventilation system, wherein the cooling circuit features an evaporator/heat exchanger (12) that is arranged in the ventilation system, and wherein a gas sensor (30) is provided in the ventilation system downstream from the evaporator/heat exchanger (12) to detect the rates of a refrigerant of the evaporator/heat exchanger (12) of the air conditioner in the conveyed air-conditioned air, characterized in that an air guidance channel (10) of the ventilation system features a deviation in the direction of gravity wherein the gas sensor (30) is arranged in a lower area of the air guidance channel at a narrow point (32).

2. Air conditioner, in particular for use in motor vehicles, with a cooling circuit and a ventilation system, wherein the cooling circuit features an evaporator/heat exchanger (12) that is arranged in the ventilation system, and wherein a gas sensor (30) is provided in the ventilation system downstream from the evaporator/heat exchanger (12) to detect the rates of a refrigerant of the evaporator/heat exchanger (12) of the air conditioner in the conveyed air-conditioned air, characterized in that an air guidance channel (10) of the ventilation system features a deviation in the direction of gravity wherein the gas sensor (30) is arranged in a lower area of the air guidance channel in an area of turbulent flow.

3. Air conditioner according to claim 1, characterized in that the narrow point (32) or the area of turbulent flow with the gas sensor (30) arranged therein is attached directly downstream from the evaporator/heat exchanger (12).

4. Air conditioner according to claim 1, characterized in that the gas sensor (30) is arranged at a point in the air guidance channel (10) in front of a branch-off.

5. Air conditioner according to claim 1, characterized in that the gas sensor (30) is arranged at a ventilation outlet in the floor area of a vehicle's passenger compartment.

6. Air conditioner according to claim 1, characterized in that the air conditioner features a refrigerant whose density is greater than that of air.

7. Air conditioner according to claim 1, characterized in that the air conditioner features carbon dioxide (R744), difluoroethane (R152a), propane (R290) or Frigene (R12) as a refrigerant.

8. Air conditioner according to claim 1, characterized in that the gas sensor (30) is an optical sensor.

9. Air conditioner according to claim 8, characterized in that an optical measured section (36) of the gas sensor (30) runs transverse to the flow direction of the air flow.

10. Air conditioner according to claim 1, characterized in that the gas sensor (30) is arranged within a deviation of the air guidance channel (10) in a lower installation position.

11. Air conditioner according to claim 1, characterized in that the gas sensor (30) is arranged at a lowest location or in the vicinity of a lowest location of the air guidance channel (10).

12. Air conditioner according to claim 1, characterized in that an electric output signal from the gas sensor (30) is evaluated to turn off the air conditioner, to close the air guidance channel (10) and/or to trigger an alarm.

13. Air conditioner according to claim 2, characterized in that the narrow point (32) or the area of turbulent flow with the gas sensor (30) arranged therein is attached directly downstream from the evaporator/heat exchanger (12).

14. Air conditioner according to claim 2, characterized in that the gas sensor (30) is arranged at a point in the air guidance channel (10) in front of a branch-off.

15. Air conditioner according to claim 2, characterized in that the gas sensor (30) is arranged at a ventilation outlet in the floor area of a vehicle's passenger compartment.

16. Air conditioner according to claim 2, characterized in that the air conditioner features a refrigerant whose density is greater than that of air.

17. Air conditioner according to claim 2, characterized in that the air conditioner features carbon dioxide (R744), difluoroethane (R152a), propane (R290) or Frigene (R12) as a refrigerant.

18. Air conditioner according to claim 2, characterized in that the gas sensor (30) is an optical sensor.

19. Air conditioner according to claim 18, characterized in that an optical measured section (36) of the gas sensor (30) runs transverse to the flow direction of the air flow.

20. Air conditioner according to claim 2, characterized in that the gas sensor (30) is arranged within a deviation of the air guidance channel (10) in a lower installation position.

21. Air conditioner according to claim 2, characterized in that the gas sensor (30) is arranged at a lowest location or in the vicinity of a lowest location of the air guidance channel (10).

22. Air conditioner according to claim 2, characterized in that an electric output signal from the gas sensor (30) is evaluated to turn off the air conditioner, to close the air guidance channel (10) and/or to trigger an alarm.

23. Method to operate an air conditioner, in particular for use in motor vehicles, with a cooling circuit and a ventilation system, wherein the cooling circuit features an evaporator/heat exchanger (12) that is arranged in the ventilation system, in which the rates of a refrigerant of the air conditioner in the conveyed air-conditioned air are detected by means of a gas sensor (30), characterized in that the ventilation system is provided with an air guidance channel (10) that features a deviation in the direction of gravity and that the detection occurs in a lower area of the air guidance channel at a narrow point (32).

24. Method to operate an air conditioner, in particular for use in motor vehicles, with a cooling circuit and a ventilation system, wherein the cooling circuit features an evaporator/heat exchanger (12) that is arranged in the ventilation system, in which the rates of a refrigerant of the air conditioner in the conveyed air-conditioned air are detected by means of a gas sensor (30), characterized in that the ventilation system is provided with an air guidance channel (10) that features a deviation in the direction of gravity and that the detection occurs in a lower area of the air guidance channel in an area of turbulent flow.

* * * * *